United States Patent
Furukoshi et al.

(10) Patent No.: US 9,601,787 B2
(45) Date of Patent: Mar. 21, 2017

(54) FUEL CELL SYSTEM HAVING A CIRCULATING CIRCUIT, A RADIATOR, A BYPASS PASSAGE AND A THREE-WAY VALVE

(71) Applicants: DENSO CORPORATION, Kariya, Aichi-pref. (JP); Shunjiro Kikawa, Kariya, Aichi-pref. (JP)

(72) Inventors: Takurou Furukoshi, Kariya (JP); Michio Nishikawa, Nagoya (JP); Nobuharu Kakehashi, Toyoake (JP); Shunjiro Kikawa, Kariya (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 158 days.

(21) Appl. No.: 14/391,097

(22) PCT Filed: Apr. 4, 2013

(86) PCT No.: PCT/JP2013/002334
§ 371 (c)(1),
(2) Date: Oct. 7, 2014

(87) PCT Pub. No.: WO2013/153782
PCT Pub. Date: Oct. 17, 2013

(65) Prior Publication Data
US 2015/0072259 A1 Mar. 12, 2015

(30) Foreign Application Priority Data
Apr. 11, 2012 (JP) ................................. 2012-090287

(51) Int. Cl.
*H01M 8/04* (2016.01)
*H01M 8/10* (2016.01)

(52) U.S. Cl.
CPC ..... *H01M 8/04067* (2013.01); *H01M 8/04029* (2013.01); *H01M 8/10* (2013.01);
(Continued)

(58) Field of Classification Search
None
See application file for complete search history.

(56) References Cited

U.S. PATENT DOCUMENTS

| 6,383,672 B1 * | 5/2002 | Fujita | H01M 2/1022 165/297 |
| 2005/0095473 A1 * | 5/2005 | Sakakida | H01M 8/04029 429/413 |

(Continued)

FOREIGN PATENT DOCUMENTS

| JP | 2005079011 A | 3/2005 |
| JP | 2005100752 A | 4/2005 |

(Continued)

OTHER PUBLICATIONS

International Search Report and Written Opinion (in Japanese with English Translation) for PCT/JP2013/002334, mailed Jul. 16, 2013; ISA/JP.

(Continued)

*Primary Examiner* — Ula C Ruddock
*Assistant Examiner* — Tony Chuo
(74) *Attorney, Agent, or Firm* — Harness, Dickey & Pierce, P.L.C.

(57) ABSTRACT

A radiator cap is connected to a circulating circuit at a connecting point located upstream of a water pump in a flow direction of coolant and that regulates a pressure in the circulating circuit to be within a predetermined pressure range that is higher than or equal to an atmospheric pressure at the connecting point. A rotary valve is disposed in the circulating circuit at upstream of the connecting point of the (Continued)

radiator cap in the flow direction of coolant. Accordingly, a cavitation is restricted from occurring, and the water pump can perform enough efficiency. A communication passage that has an upstream end and a downstream end connected to the circulating circuit may be disposed instead of the radiator cap. In this case, a pressure regulating valve is disposed in the communication passage.

14 Claims, 8 Drawing Sheets

(52) U.S. Cl.
CPC .......... *H01M 2250/20* (2013.01); *Y02E 60/50* (2013.01); *Y02T 90/32* (2013.01)

(56) References Cited

U.S. PATENT DOCUMENTS

2010/0326533 A1* 12/2010 Mooney ............... F16K 7/14
137/12
2011/0177416 A1* 7/2011 Suematsu ......... H01M 8/04029
429/440

FOREIGN PATENT DOCUMENTS

JP 2009036372 A 2/2009
JP 2010282808 A 12/2010

OTHER PUBLICATIONS

Office Action dated Jan. 27, 2015 in corresponding Japanese Application No. 2012-090287.

* cited by examiner

FUEL CELL SYSTEM HAVING A CIRCULATING CIRCUIT, A RADIATOR, A BYPASS PASSAGE AND A THREE-WAY VALVE

CROSS REFERENCE TO RELATED APPLICATIONS

This application is a U.S. National Phase Application under 35 U.S.C. 371 of International Application No. PCT/JP2013/002334 filed on Apr. 4, 2013 and published in Japanese as WO 2013/153782 A1 on Oct. 17, 2013. This application is based on and claims the benefit of priority from Japanese Patent Application No. 2012-090287 filed on Apr. 11, 2012. The entire disclosures of all of the above applications are incorporated herein by reference.

FIELD OF THE INVENTION

The present disclosure relates to a fuel cell system in which coolant circulates between a fuel cell unit and a radiator so as to cool a fuel cell.

BACKGROUND OF THE INVENTION

Conventionally, a fuel cell system is known to have: a radiator disposed in a circulating circuit of coolant that cools a fuel cell unit; a bypass passage connecting an upstream side of the radiator of the circulating circuit and an downstream side of the radiator of the circulating circuit so as to make coolant bypasses the radiator; a pump device arranged downstream of a connecting point where the bypass passage is connected to the circulating circuit; and a three-way valve device that is disposed at the connecting point where the bypass passage is connected to the circulating circuit so as to adjust a flow ratio between coolant flowing through the radiator and coolant flowing through the bypass passage (see Patent Document 1).

PRIOR ART DOCUMENT

Patent Document 1: Japanese Unexamined Patent Publication No. 2010-282808

SUMMARY OF THE INVENTION

However, according to investigations of inventors of the present disclosure, an abnormality such as an inadequate flow amount of circulating coolant in the conventional fuel cell system of Patent Document 1 since the pump device cannot perform enough efficiency. The inventors made earnestly investigations and found that a cavitation occurs due to a local low-pressure area provided between inside of the three-way valve device and inside of the pump device. In the result, the pump device cannot perform the enough efficiency due to the cavitation. That is, the inventors found that the pump device can perform the enough efficiency by restricting an occurrence of the cavitation.

The present disclosure has been made in diagram of the fore going point, and it is an object of the present disclosure to provide a fuel cell system with which the occurrence of the cavitation is restricted, and the pump device can perform the enough efficiency.

To achieve the above object, according to an aspect of the present disclosure, a heat pump cycle includes: a fuel cell unit having a fuel cell; a circulating circuit in which coolant circulates to cool the fuel cell; a radiator that is disposed in the circulating circuit and radiates heat of the coolant to outside; a bypass passage that (i) is branched from the circulating circuit at a separating point that is located upstream of the radiator in a flow direction of coolant, (ii) is connected to the circulating circuit at a meeting point that is located downstream of the radiator in the flow direction of coolant, and (iii) makes the coolant bypass the radiator; a three-way valve device that is disposed in the circulating circuit and adjusts a flow ratio of a coolant flowing through the radiator to a coolant flowing through the bypass passage; a pump unit that is positioned downstream of the meeting point in the circulating circuit and makes the coolant circulate in the circulating circuit; and a pressure regulator that is connected to the circulating circuit at a connecting point located upstream of the pump unit in a flow direction of coolant and that regulates a pressure in the circulating circuit to be within a predetermined pressure range that is higher than or equal to an atmospheric pressure at the connecting point. The three-way valve device is disposed upstream of the connecting point in the flow direction of coolant.

Accordingly, at the connecting point where the pressure regulator is connected to the circulating circuit, a pressure in the circulating circuit can be kept within the predetermined pressure range that is higher than or equal to the atmospheric pressure. Thus, even if a pressure loss in the three-way valve device is large, a local low-pressure area where the cavitation occurs is hardly provided between an inside of the pump unit and the connecting point downstream of the three-way valve device in the flow direction of coolant. In the result, the cavitation can be restricted from occurring between the connecting point of the pressure regulator and the inside of the pump unit. Therefore, the pump unit is restricted from (i) failing in securing an enough flow amount and (ii) causing an erosion therein. Accordingly, the pump unit can perform in enough efficiency.

DETAILED DESCRIPTION OF THE PREFERRED EMBODIMENTS

Figure 1:
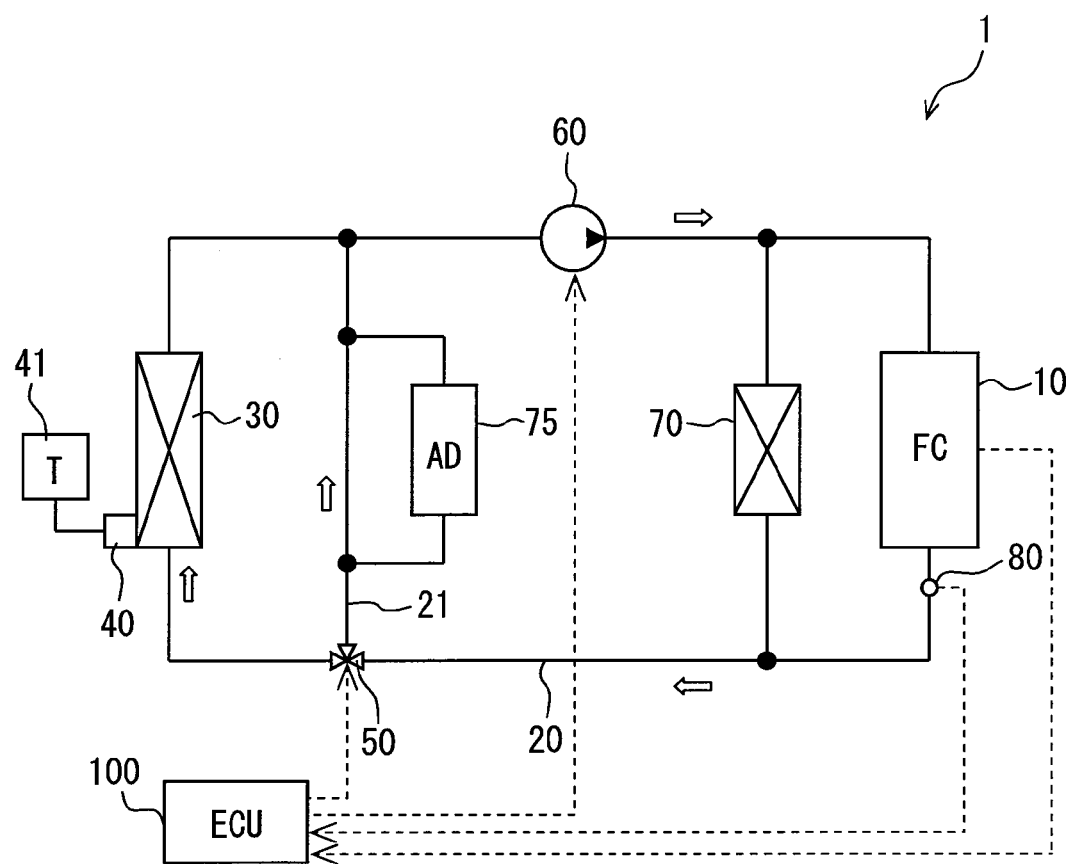
FIG. 1 is a diagram showing a fuel cell system according to a first embodiment of the present disclosure.

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described referring to FIGS. 1 to 8.

A fuel cell system 1 of the present embodiment is disposed, for example, in a vehicle and can be used as a power source that supplies electric power to an electric motor for a traveling of the vehicle or the like. As shown FIG. 1, the fuel cell system 1 includes a fuel cell stack 10 (i.e., FC stack), a circulating circuit 20, a radiator 30, a radiator cap 40, a rotary valve 50, a water pump 60, and a controller 100 (i.e., an ECU).

The FC stack 10 has cells of a fuel cell that generates electric power by using an electrochemical reaction of hydrogen and oxygen. As the fuel cell, a solid-polymer fuel cell may be used. A type of the fuel cell is not limited to the above type, and the fuel cell may be a phosphoric-acid-type fuel cell, a fused-carbonate-type fuel cell, or the like. The FC stack 10 may be used as an example of a fuel cell unit having a fuel cell.

The circulating circuit 20 is a circuit that makes coolant for cooling the fuel cell circulates external of the FC stack 10 such that the coolant flows from the FC stack 10 and flows back to the FC stack 10. The circulating circuit 20 connects a coolant outlet port of the FC stack 10 that is shown at a lower side and a coolant inlet port of the FC stack 10 that is shown at a higher side. A mixed solution of ethylene glycol and water may be used so as to restrict the coolant from being frozen in a cold state.

The radiator 30 is disposed in the circulating circuit 20 and radiates heat of the coolant to outside due to a heat exchange between the coolant and outside air. The radiator cap 40 is attached, for example, to a tank part of the radiator 30. The radiator cap 40 is connected to a reserve tank 41 that stores an excess coolant. The reserve tank 41 is, for example, made of a synthetic resin and formed in a translucent container. The reserve tank 41 is, in other words, a simple-closed-type reserve tank in which an internal pressure is equivalent to an atmospheric pressure. The radiator 30 may be used as an example of a radiator that is disposed in the circulating circuit 20 and radiates heat of coolant to outside.

The radiator cap 40 has a negative-pressure valve and a pressure valve (i.e., a high-pressure valve). When a pressure in the circulating circuit 20 becomes lower than or equal to the atmospheric pressure, the radiator cap 40 opens the negative-pressure valve so as to introduce coolant in the reserve tank 41 into the circulating circuit 20. When the pressure in the circulating circuit 20 becomes higher than or equal to the atmospheric pressure, the radiator cap 40 opens the pressure valve so as to introduce the coolant in the circulating circuit 20 into the reserve tank 41. The radiator cap 40 is directly connected to the radiator 30 that configures a part of the circulating circuit 20. The radiator cap 40 may be used as an example of a pressure regulator regulating the pressure in the circulating circuit 20 at a connecting point (i.e., a connecting location) where the radiator cap 40 is connected to the circulating circuit 20 to be kept within a predetermined pressure range that is higher than or equal to the atmospheric pressure.

The circulating circuit 20 has a bypass passage 21 that makes coolant bypass the radiator 30 and flow in the bypass passage 21. That is, the bypass passage 21 is branched from the circulating circuit 20 at a separating point (i.e., a separating location) upstream of the radiator 30 in a flow direction of coolant and is connected to the circulating circuit 20 at a meeting point (i.e., a meeting location) downstream of the radiator 30 in the flow direction of the coolant.

The rotary valve 50 is disposed at the separating point where the bypass passage 21 is branched from the circulating circuit 20. The rotary valve 50 is a valve device that adjusts a flow ratio of a flow amount of coolant passing through the radiator 30 to a flow amount of coolant flowing in the bypass passage 21. Alternatively, the rotary valve 50 may be disposed in the circulating circuit 20. The rotary valve 50 may be used as an example of a three-way valve device that adjusts a flow ratio of a coolant flowing through the radiator to a coolant flowing through the bypass passage 21.

Figure 2:
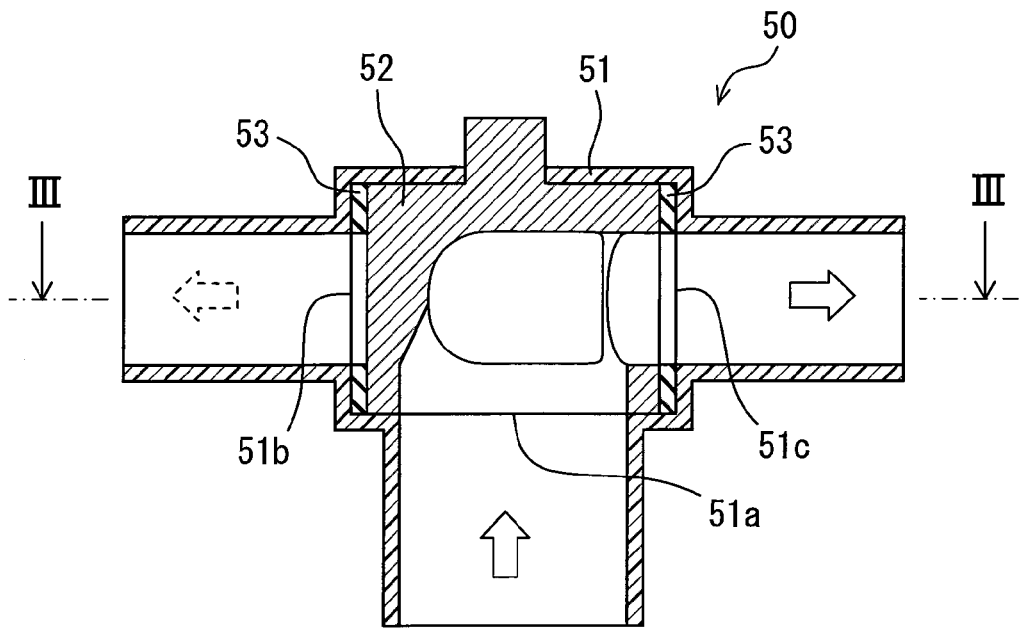
FIG. 2 is a schematic cross-sectional diagram illustrating a rotary valve used for the fuel cell system according to the first embodiment.
Figure 3:
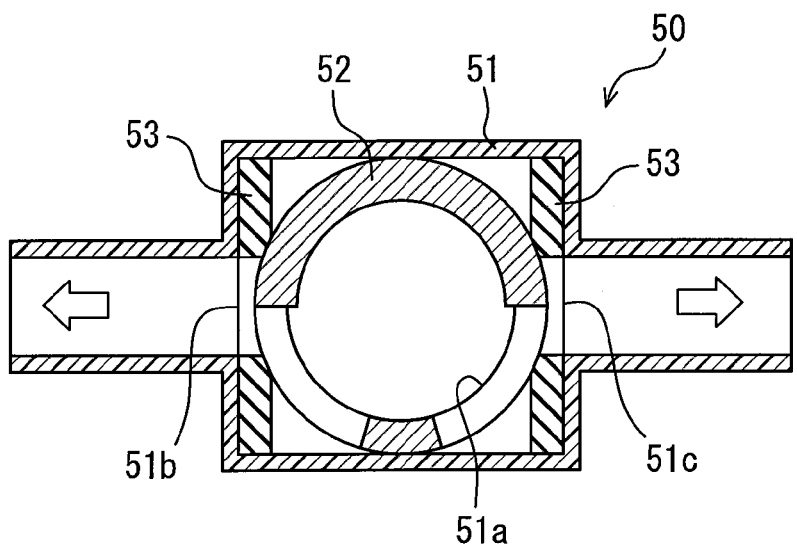
FIG. 3 is a cross-sectional diagram taken along a line III-III shown in FIG. 2.
Figure 4:
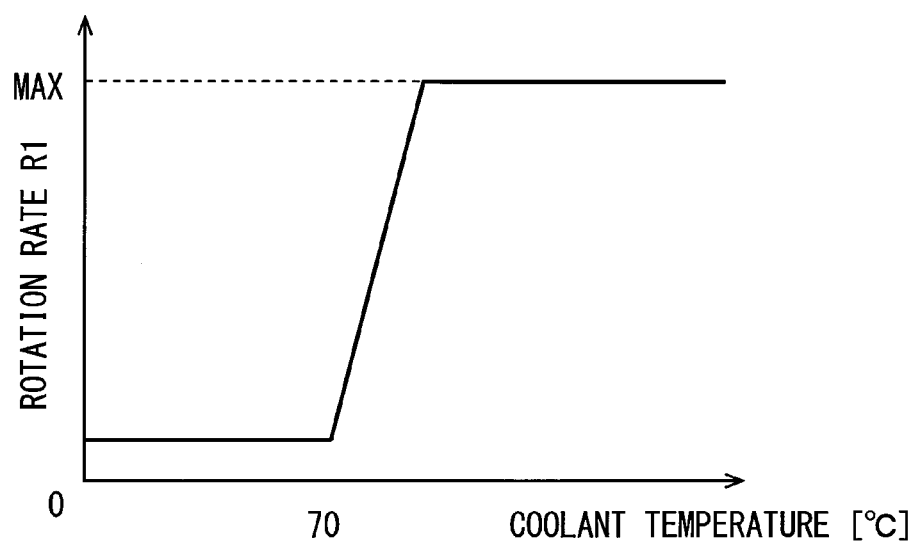
FIG. 4 is a diagram showing a control characteristic of a water pump relative to a coolant temperature at an outlet of a fuel cell stack of the fuel cell system according to the first embodiment.
Figure 5:
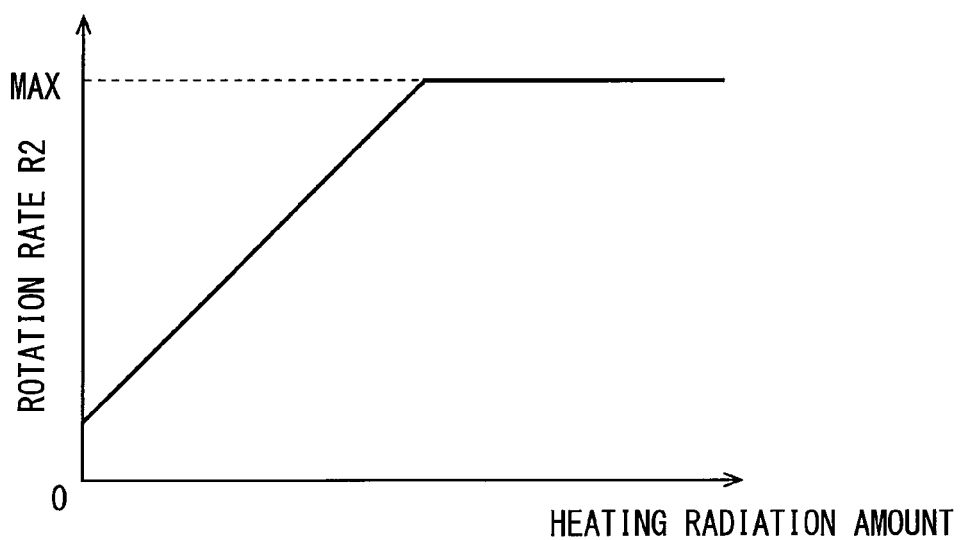
FIG. 5 is a diagram showing a control characteristic of a water pump relative to a heating radiation amount of the fuel cell of the fuel cell stack according to the first embodiment.

As shown in FIGS. 2 and 3, the rotary valve 50 has, for example, a housing 51 made of synthetic resin or the like, a valve body 52 rotatably disposed in the housing 51, and a packing 53 that is interposed between the housing 51 and the valve body 52 and that is made of rubber or the like.

The rotary valve 50 is provided with an inlet 51a for coolant at a bottom side in a state shown in FIG. 2. Further, a first outlet 51b (i.e., a first opening) that makes coolant flows to a side of the radiator 30 is provided at a left side in the state shown in FIG. 2, and a second outlet 51c (i.e., a second opening) that makes coolant flow to a side of the bypass passage 21 at a right side in the state shown in FIG. 2 is provided.

The valve body 52 has a rotation shaft extending in a top-bottom direction in the state shown in FIG. 2 (i.e., a front-back surface direction of a paper on which FIG. 3 is drawn). The valve body 52 that makes the inlet 51a normally opens and that changes an opening degree of the first outlet 51b and an opening degree of the second outlet 51c with a rotation of the valve body 52. The valve body 52 is integrated to configure a single valve body that changes the opening degree of the first outlet 51b and the opening degree of the second outlet 51c. FIG. 2 shows a state that the valve body 52 opens only the second outlet 51c of both of the outlets 51b, 51c. FIG. 3 shows a state that the valve body 52 opens both of the outlets 51b, 51c at a generally equal degree.

As shown in FIG. 1, a coolant passage is disposed in parallel with the bypass passage 21, and an ion-absorption unit 75 that configures an ion-absorption mean is arranged in the coolant passage. The ion-absorption unit 75 is filled with ion-exchange resin. Since coolant is in contact with the fuel cell in the FC stack 10, ion is absorbed and removed from the coolant in the ion-absorption unit 75 such that an increase of an electric conductivity of the coolant is restricted.

The water pump 60 is disposed in the circulating circuit 20 at a downstream side of the meeting point in a flow direction of coolant where the bypass passage 21 is connected to the circulating circuit 20. That is, the water pump 60 is disposed at the downstream side of the meeting point where the bypass passage 21 is connected to the circulating circuit 20 and at an upstream side of the FC stack 10. The water pump 60 is a circulation pump for making coolant circulates in the circulating circuit 20. The water pump 60 may be, for example, a pump unit in which an impeller is rotated in a pump housing. The water pump 60 may be used as an example of a pump unit that is disposed at the downstream side of the meeting point where the bypass passage 21 is connected to the circulating circuit 20 and that makes coolant circulates in the circulating circuit 20.

A temperature sensor 80 that is a temperature detecting mean detecting a temperature of coolant flowing out of the FC stack 10 is disposed in the circulating circuit 20 around a connection terminal of the FC stack 10 where the coolant outlet port of the FC stack 10 is connected to the circulating circuit 20.

A coolant passage that bypasses the FC stack 10 is further disposed in the circulating circuit 20, and an intercooler 70 is arranged in the coolant passage that bypasses the FC stack 10. The intercooler 70 is a heat exchanger in which a heat exchange between air supplied to the fuel cell of the FC stack 10 and coolant is performed. The intercooler 70 adjusts a temperature of air supplied to the fuel cell to be preferred temperature.

In the fuel cell system 1 of the present embodiment, a coolant passage such as the circulating circuit 20 and the bypass passage 21 is configured by a pipe. The bypass passage 21 and a passage that is connected to an outlet side of the radiator 30 are preferably configured by pipes made of synthetic resin that has relatively high rigidity or metal.

The ECU 100 is a control mean that controls the system. Output information from the FC stack 10 such as a heating radiation amount or a physical amount (e.g., an electric power generation amount) relative to the heating radiation amount and temperature information output from the temperature sensor 80 is input to the ECU 100. The ECU 100 controls an operation of the rotary valve 50 and an operation of the water pump 60 based on the information.

The ECU controls the water pump 60 based on, for example, the temperature information of coolant that is detected by the temperature sensor 80 at an outlet of the FC stack 10 and the information about the heating radiation amount from the FC stack 10. The ECU 100 pre-stores a control characteristic (i.e., a rotation rate R1) of the water pump 60 relative to a coolant temperature at the outlet of the FC stack 10, as an example shown in FIG. 4. The ECU 100 further pre-stores a control characteristic (i.e., a rotation rate R2) of the water pump 60 relative to the heating radiation amount of the FC stack 10, as an example shown in FIG. 5. The ECU 100 compares a value of the rotation rate R1 to a value of the rotation rate R2 that are calculated based on the input information and on the pre-stored control characteristics. The ECU 100 operates the water pump 60 at the value of the rotation rate R1 or the value of the rotation rate R2, whichever is higher.

The ECU 100 controls the rotary valve 50 based on the temperature information of coolant that is detected by the temperature sensor 80 at the outlet of the FC stack 10. The ECU 100 pre-stores a control characteristic (i.e., an operation angle (or a rotation angle) of the valve body 52) of the rotary valve 50 relative to the coolant temperature at the outlet of the FC stack 10, as an example shown in FIG. 6. The ECU 100 controls an operation of the valve body 52 of the rotary valve 50 to be an operation angle calculated from the input temperature information and the control property.

For example, when the coolant temperature at the outlet of the FC stack 10 is higher than or equal to 70° C., the ECU 100 fully opens the first outlet 51$b$ and fully closes the second outlet 51$c$ such that all amount of coolant circulating in the circulating circuit 20 flows through the radiator 30. When the coolant temperature at the outlet of the FC stack 10 is lower than or equal to 60° C., the ECU 100 fully closes the first outlet 51$b$ and fully opens the second outlet 51$c$ such that the all amount of coolant circulating in the circulating circuit 20 flows through the bypass passage 21.

Figure 6:
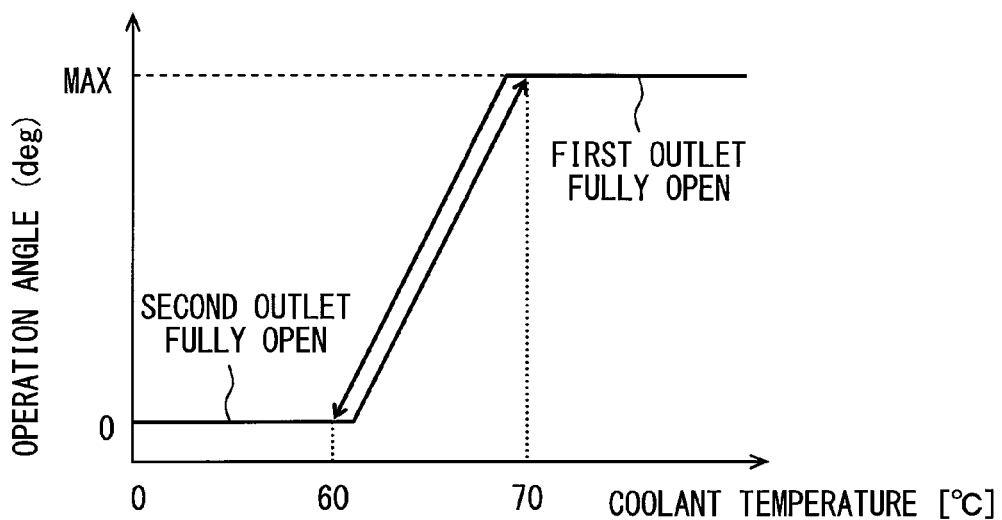
FIG. 6 is a diagram showing a control characteristic of the rotary valve relative to the coolant temperature at the outlet of the fuel cell stack according to the first embodiment.

When the coolant temperature at the outlet of the FC stack 10 is between 60° C. and 70° C., the operation degree of the valve body 52 is set to an intermediate opening degree where both of the first outlet 51$b$ and the second outlet 51$c$ are open such that coolant flows through both of the radiator 30 and the bypass passage 21. Accordingly, a temperature of the fuel cell adjusted by coolant becomes about 65° C. In FIG. 6, an example that an operation angle characteristic during the intermediate opening degree changes linearly relative to the coolant temperature at the outlet of the FC stack 10. However, the present disclosure is not limited to the example.

According to the fuel cell system 1 of the present embodiment, the radiator cap 40 is arranged to be connected to the circulating circuit 20 at the upstream side of the water pump 60 in the flow direction of coolant. The radiator cap 40 regulates a pressure at the connecting point (i.e., the connecting location) in the circulating circuit 20 to be kept within the predetermined pressure range that is higher than or equal to the atmospheric pressure. The rotary valve 50 is disposed in the circulating circuit 20 at the upstream side of the connecting point of the radiator cap 40 in the flow direction of coolant. That is, the radiator cap 40 is arranged between the rotary valve 50 and the water pump 60 in the circulating circuit 20.

Accordingly, at the connecting point where the radiator cap 40 is connected to the circulating circuit 20, the pressure in the circulating circuit 20 can be kept in the predetermined pressure range that is higher than or equal to the atmospheric pressure. Therefore, even if the pressure loss due to the rotary valve 50 is large, a local low-pressure area where cavitation occurs is hardly provided between the connecting point of the radiator cap 40 that is located at the downstream side of the rotary valve 50 and the water pump 60 (specifically, inside the water pump 60). Accordingly, an occurrence of the cavitation can be restricted. Thus, the water pump 60 is restricted from (i) failing in securing an enough flow amount and (ii) causing an erosion therein. Accordingly, the water pump 60 can perform in enough efficiency.

In the circulating circuit 20 of the fuel cell system 1, it is often the case that coolant flows at a large flow amount compared to in a coolant circulating circuit of an internal combustion engine. The reason is that a temperature distribution in the FC stack 10 is required to be small so as to improve efficiencies of the plural fuel cells. Although the cavitation easily occurs between inside of the rotary valve 50 and inside of the water pump 60 by making coolant flow in the circulating circuit 20 at the large flow amount, the occurrence of the cavitation can be restricted according to the fuel cell system 1 of the present disclosure.

The radiator cap 40 is used as an example of the pressure regulator regulating the pressure in the circulating circuit 20 at the connecting point (i.e., a connecting location) where the radiator cap 40 that is disposed in the radiator 30 is connected to the circulating circuit 20 to be kept within the predetermined pressure range that is higher than or equal to the atmospheric pressure. The radiator cap 40 may be used as an example of the pressure regulator.

Accordingly, the cavitation can be restricted from occurring between the connecting point of the radiator cap 40 and inside of the water pump 60 by a simple configuration that the radiator cap 40 that is disposed (e.g., directly attached) to be connected to the radiator 30 is arranged between the rotary valve 50 and the water pump 60 of the circulating circuit 20.

Figure 7:
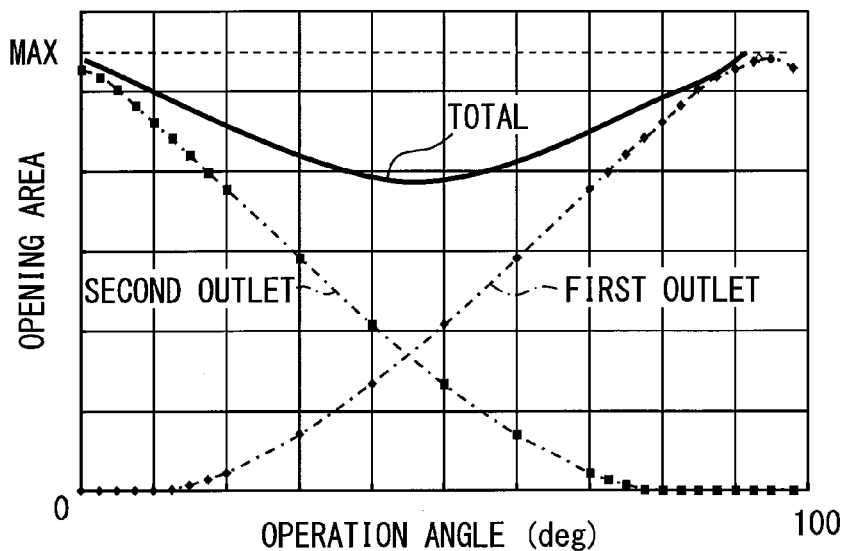
FIG. 7 is a diagram showing a relation among an operation angle and an opening area of the rotary valve according to the first embodiment.
Figure 8:
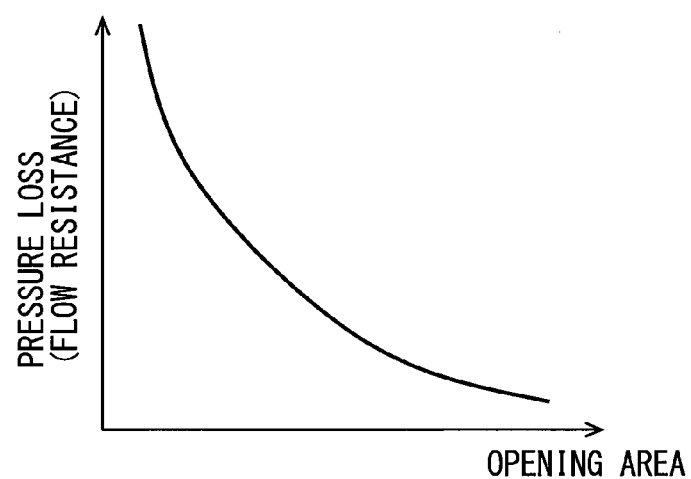
FIG. 8 is a diagram showing a relation among the opening area of the rotary valve and a pressure loss according to the first embodiment.

According to the rotary valve 50 having the above configuration, a total of opening areas at the intermediate opening degree where both of the first outlet 51b and the second outlet 51c are open is smaller than an opening area in a case that one of the first outlet 51b and the second outlet 51c is fully open, for example, as shown in FIG. 7. In FIG. 7, one-dot lines show opening areas of the openings 51b, 51c relative to the operation angle of the valve body 52, respectively, and a solid line shows the total of the opening areas of the openings 51b, 51c. According to the rotary valve 50 of the present embodiment, the total of the opening areas is minimized when an opening degree of the first outlet 51b is generally equal to an opening degree of the second outlet 51c. As shown in an example of FIG. 8, a pressure loss (i.e., a flow resistance) of coolant flowing through the opening increases as the total of the opening areas decreases.

Accordingly, when the valve body 52 is set to the intermediate opening degree where both of the first outlet 51b and the second outlet 51c are open, the pressure loss of the coolant flowing through the rotary valve 50 increases compared to the case that one of the first outlet 51b and the second outlet 51c is open. That is, when the valve body 52 is set to the intermediate opening degree, the local low-pressure area is easily provided at a downstream side of the valve body 52. Even if the rotary valve 50 having such a characteristic is used, the cavitation can be restricted from occurring between the connecting point of the radiator cap 40 that is located downstream of the rotary valve 50 in the flow direction of coolant and inside of the water pump 60.

Second Embodiment

A second embodiment will be described referring to FIG. 9 hereafter.

The second embodiment is an example that the present disclosure is applied to a system having a so-called completely-sealed type reserve tank. A part that corresponds to a matter described in the first embodiment will be assigned with the same reference number, and redundant explanation for the part will be omitted.

Figure 9:
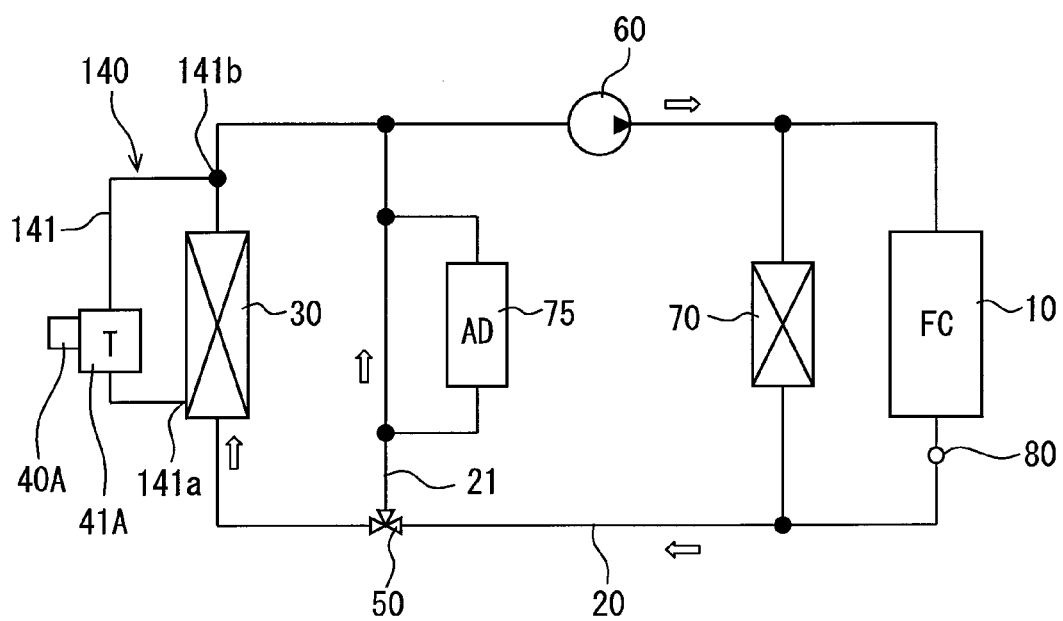
FIG. 9 is a diagram showing a fuel cell system according to a second embodiment.

As shown in FIG. 9, the fuel cell system 1 of the present embodiment has a pressure regulating mechanism 140. The pressure regulating mechanism 140 has a communication passage 141 disposed in parallel with the circulating circuit 20, a reserve tank 41A disposed in the communication passage 141, and a cap 40A attached to the reserve tank 41A. The pressure regulating mechanism 140 may be used as an example of the pressure regulator, and the cap 40A may be used as an example of a pressure regulating valve disposed in the communication passage 141.

The communication passage 141 has an upstream end 141a and a downstream end 141b that are communicated with the circulating circuit 20. In the present example, the upstream end 141a is connected to a tank part of the radiator 30 that configures a part of the circulating circuit 20 so as to communicate with inside of the radiator 30. On the other hand, the downstream end 141b is connected to a part of the circulating circuit 20 at downstream of the radiator 30 and upstream of the meeting point of the bypass passage 21 so as to communicate with inside of the circulating circuit 20. Thus, a downstream-side communicating point where the downstream end 141b and the circulating circuit 20 are connected to each other may correspond to a connecting point where the pressure regulator is connected to the circulating circuit.

The cap 40A has a similar configuration as the radiator cap 40 described in the first embodiment. Accordingly, the reserve tank 41A is the so-called completely-sealed reserve tank in which pressure is regulated in the predetermined pressure range that is higher than or equal to the atmospheric pressure.

According to the configuration of the present embodiment, similar effects that is similar to that of the first embodiment can be performed. Furthermore, the cavitation is restricted from occurring between inside of the water pump 60 and the connecting point of the downstream end 141b of the communication passage 141 by a simple configuration that the downstream end 141b of the communication passage 141 in which a pressure is regulated by the cap 40A is disposed between the rotary valve 50 and the water pump 60 that are disposed in the circulating circuit 20.

Third Embodiment

A third embodiment will be described referring to FIG. 10 hereafter.

In the third embodiment, a connecting point where the downstream end 141b of the communication passage 141 is connected to the circulating circuit 20 is changed compared to the second embodiment. A part that corresponds to a matter described in the first and second embodiments will be assigned with the same reference number, and redundant explanation for the part will be omitted.

Figure 10:
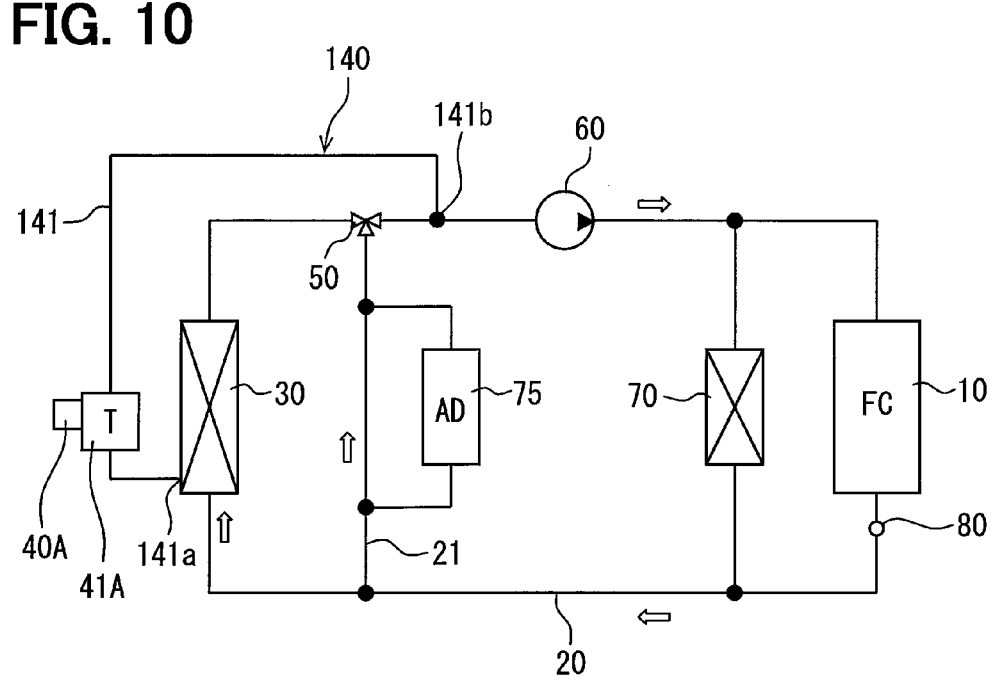
FIG. 10 is a diagram showing a fuel cell system according to a third embodiment.

As shown in FIG. 10, in the fuel cell system 1 of the present embodiment, the downstream end 141b of the communication passage 141 is connected to the circulating circuit 20 at downstream of the meeting point where the bypass passage 21 is connected to the circulating circuit 20 and at upstream of the water pump 60 so as to communicate with inside of the circulating circuit 20. A downstream-side communicating point where the downstream end 141b and the circulating circuit 20 are connected to each other may correspond to a connecting location where the pressure regulator and the circulating circuit 20 are connected to each other.

In the present embodiment, the rotary valve 50 is located at the meeting point where the bypass passage 21 is connected to the circulating circuit 20. Therefore, the inlet 51a described in the first embodiment becomes an outlet for coolant, and the both outlets 51b, 51c become an inlet for coolant.

According to the configuration of the present embodiment, similar effects that are similar to those of the second embodiment can be performed. The rotary valve 50 may be located at the separating point where the bypass passage 21 is branched from the circulating circuit 20.

Fourth Embodiment

A fourth embodiment will be described referring to FIGS. 11 and 12 hereafter.

In the fourth embodiment, a pressurizing device that pressurizes inside of the reserve tank is further disposed compared to the second embodiment. A part that corresponds to a matter described in the first and second embodiments will be assigned with the same reference number, and redundant explanation for the part will be omitted.

Figure 11:
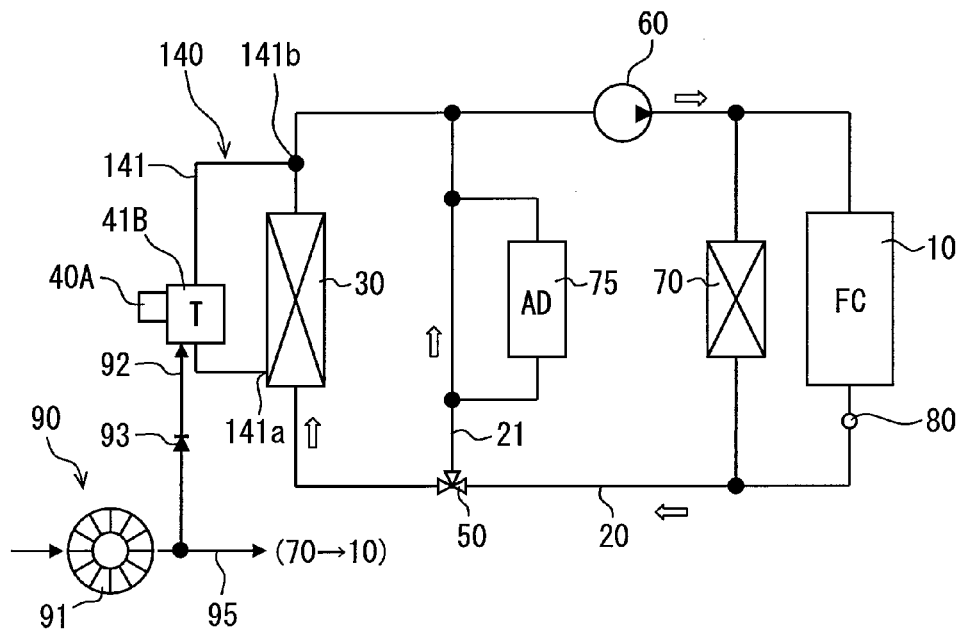
FIG. 11 is a diagram showing a fuel cell system according to a fourth embodiment.
Figure 12:
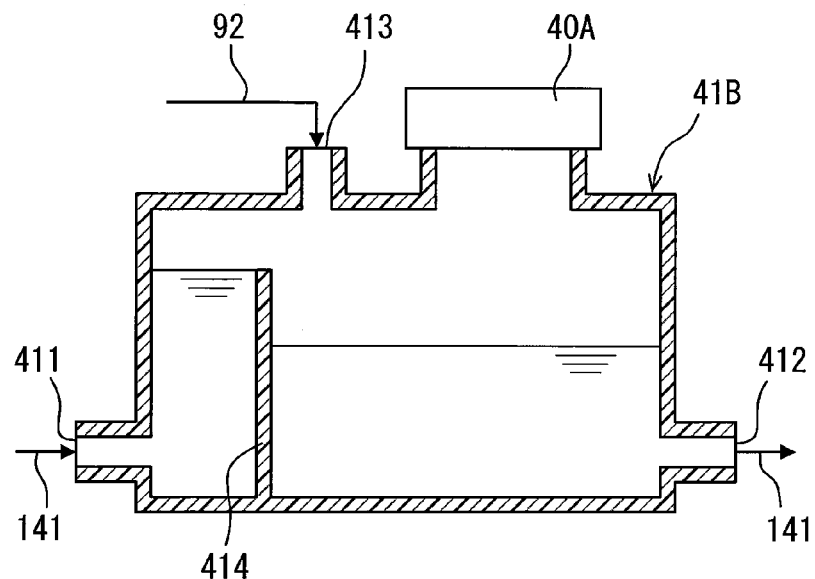
FIG. 12 is a cross-sectional diagram illustrating a reserve tank of the fuel cell system according to the fourth embodiment.

As shown in FIG. 11, the fuel cell system 1 of the present embodiment has a pressurizing device 90. The pressurizing device 90 has a compressor 91 compressing air, an introducing pipe 92 that introduces the compressed air compressed in the compressor 91 into a reserve tank 41B, and a check valve 93 that restricts fluid in the introducing pipe 92 from flowing in an opposite direction. In the present example, the introducing pipe 92 has an upstream end that is branched from and connected to a supply pipe 95 that supplies the compressed air compressed in the compressor 91 to the fuel cell of the FC stack 10 through the intercooler 70.

The reserve tank 41B of the present embodiment is so-called completely-sealed type reserve tank similar to the second and third embodiments. However, as shown in FIG. 12, the reserve tank 41B is different from the reserve tank 41A in that the reserve tank 41A has an air inlet 413. An upstream end of the introducing pipe 92 is connected to the air inlet 413.

The reserve tank 41B is, for example, made of a synthetic resin and formed in a translucent container. The reserve tank 41B has an inlet 411 and an outlet 412 for coolant. The communication passage 141 has an upstream part that extends from the upstream end 141a, and a downstream end 141b of the upstream part is connected to the inlet 411. The communication passage 141 has a downstream part that extends to the downstream end 141b, and an upstream end of the downstream part is connected to the outlet 412.

In the reserve tank 41B, a partition wall 414 is provided to extend from a bottom of the reserve tank 41B and partitions inside of the reserve tank 41B into two storage parts. The inlet 411 is provided at a location adjacent to the storage part shown at a left side in FIG. 12, and the outlet 412 is provided at a location adjacent to the storage part shown at a right side in FIG. 12. Accordingly, coolant that flows from the inlet 411 and flows over the partition wall 414 can flow out from the outlet 412. The air inlet 413 is provided at a ceiling part of the reserve tank 41B.

According to a configuration of the present embodiment, similar effects that are similar to that of the second embodiment can be performed.

Moreover, the pressurizing device 90 pressurizes inside of the communication passage 141 through the reserve tank 41B. Accordingly, a pressure in the communication passage 141 that is regulated by the cap 40A can be relatively high within the predetermined pressure range that is higher than or equal to the atmospheric pressure. Thus, at the connecting point where the downstream end 141b of the communication passage 141 is connected to the circulating circuit 20, a pressure in the circulating circuit 20 can be relatively high within the predetermined pressure range that is higher than or equal to the atmospheric pressure. Therefore, the cavitation can be certainly restricted from occurring between inside of the water pump 60 and the connecting point where the downstream end 141b is connected to the circulating circuit 20.

Furthermore, the pressure regulating mechanism 140 has the reserve tank 41B that is disposed in the communication passage 141 and stores an excess coolant. The pressurizing device 90 has the compressor 91 and the introducing pipe 92 that introduces the compressed air compressed in the compressor 91 into the reserve tank 41B. Accordingly, inside of the communication passage 141 can be easily pressurized by introducing the compressed air compressed in the compressor 91 into the reserve tank 41B through the introducing pipe 92.

Moreover, the supply pipe 95 is disposed to supply the compressed air compressed in the compressor 91 to the fuel cell. Accordingly, the compressed air compressed in the compressor 91 can be supplied also to the fuel cell through the supply pipe 95. Thus, the compressor 91 can be used both as a pressurizing source of the communication passage 141 and as an air-supplying source for the fuel cell. In other words, it is not necessary to dispose a dedicated compressor for the pressurizing source of the communication passage 141. Therefore, a configuration of the fuel cell system can be simplified.

When the electric power generation amount in the FC stack 10 is large, a discharge capacity of the compressor 91 is increased since the fuel cell needs a large volume of air. Furthermore, when the electric power generation amount in the FC stack 10 is large, the rotation rate of the water pump 60 increases since the heating radiation amount of the FC stack 10 increases in proportion. When the rotation rate of the water pump 60 increases, a pressure can decrease easier at the suction side of the water pump 60. However, a supplying capacity of the compressor 91 for supplying the compressed air increases in proportion due to the above reason. Thus, the pressurizing device 90 having an increased supplying capacity for supplying the compressed also can pressurize inside of the communication passage 141 certainly, when the electric power generation amount in the FC stack 10 increases.

The introducing pipe 92 has the check valve 93. Accordingly, air from the reserve tank 41B can be restricted from flowing in the introducing pipe 92 in an opposite direction, and inside of the reserve tank 41B can easily be kept to have a high pressure. Thus, the compressed air is introduced through the introducing pipe 92 only when the pressure in the reserve tank 41B becomes lower than a discharge pressure of the compressor 91. Accordingly, a workload of the compressor 91 can be restricted from increasing.

Moreover, air and coolant in the reserve tank 41B can be certainly restricted from flowing in the introducing pipe 92 in the opposite direction and flowing to the compressor 91 and the FC stack 10, for example, when the compressor 91 is stopped. The air inlet 413 to which the introducing pipe 92 is connected is provided at the ceiling part of the reserve tank 41B and is adjacent to an air storage area that is upward of a coolant storage part. Thus, the coolant in the reserve tank 41B can be more certainly restricted from flowing in the introducing pipe 92 in the opposite direction and flowing to the compressor 91 and the FC stack 10.

Fifth Embodiment

A fifth embodiment will be described hereafter referring to FIG. 13.

In the fifth embodiment, the connecting point where the downstream end 141b of the communication passage 141 is connected to the circulating circuit 20 is changed compared to the fourth embodiment. A part that corresponds to a matter described in the first through fourth embodiments will be assigned with the same reference number, and redundant explanation for the part will be omitted.

Figure 13:
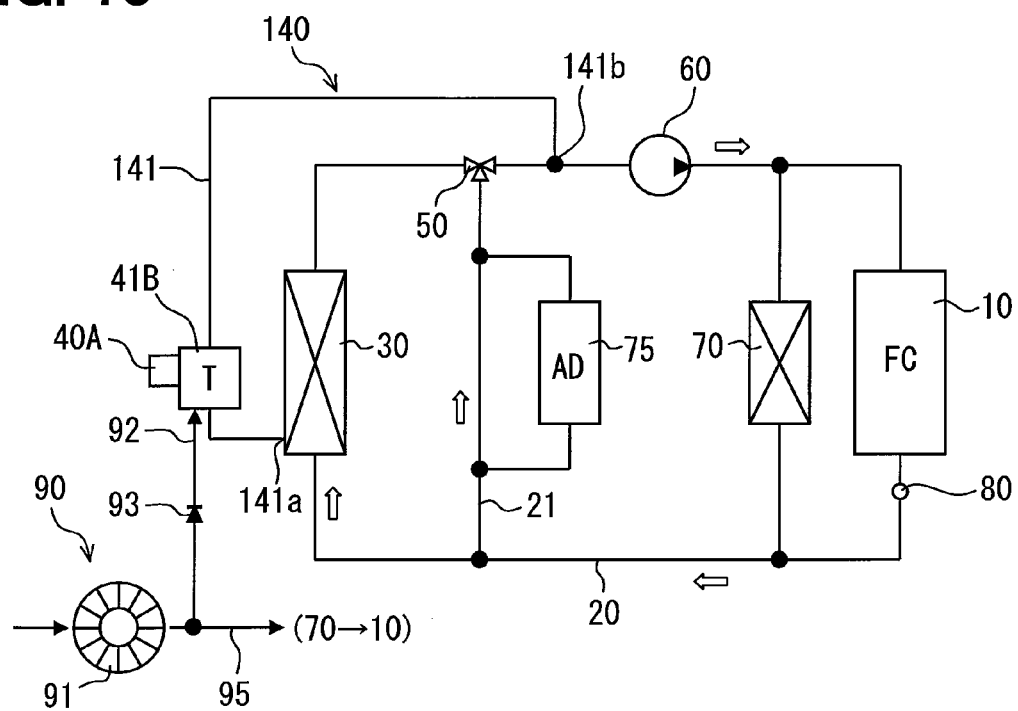
FIG. 13 is a diagram showing a fuel cell system according to a fifth embodiment.

As shown in FIG. 13, according to the fuel cell system of the present embodiment, the downstream end 141b of the communication passage 141 is connected to the circulating circuit 20 at a location that is downstream of the meeting point where the bypass passage 21 is connected to the circulating circuit 20 and that is upstream of the water pump 60 so as to communicate with the circulating circuit 20, similar to the third embodiment.

Further, the rotary valve 50 is located at the meeting point where the bypass passage 21 is connected to the circulating circuit 20, also similar to the third embodiment. According to a configuration of the present embodiment, similar effects that are similar to those of the fourth embodiment can be performed. In the present embodiment, the rotary valve 50 may be located at the separating point where the bypass passage 21 is branched from the circulating circuit 20, similar to the third embodiment.

Preferable embodiments of the present disclosure are described above. However, the present disclosure is not limited to the above embodiments, and various changes may be made without departing from the scope of the present disclosure.

Although the radiator cap 40 that is disposed to be connected to the radiator 30 is used as an example of the pressure regulator that is a pressure regulating mean according to the first embodiment, the present disclosure is not limited to the example. For example, a cap having a similar configuration that is similar to the configuration of the radiator cap 40 may be disposed to be connected to the circulating circuit 20.

Although the cap 40A that is attached to the reserve tank is used as an example of the pressure regulating valve of the pressure regulating mechanism 140 according to the second through fifth embodiments, the present disclosure is not limited to the example. For example, the cap 40A may be located in the communication passage 141.

Although the upstream end 141a of the communication passage 141 is connected to the radiator 30 according to the second through fifth embodiments, the present disclosure is not limited to the example. For example, the upstream end 141a may be connected to a part that is upstream of the radiator 30 in the circulating circuit 20.

Although the rotary valve 50 is used as the three-way valve device according to the above embodiments, the present disclosure is not limited to the example. For example, a valve body that slidably moves in a straight line may adjust the flow ratio.

Although the total of opening areas in the case that the rotary valve 50 is open at the intermediate opening degree is smaller than the opening area in the case that one of the outlets is fully open, the present disclosure is not limited to the example. For example, the total of opening areas at the intermediate opening degree may be equal to the opening area in a case that one of the outlets is fully open. Alternatively, the total of opening areas at the intermediate opening degree may be larger than the opening area in a case that one of the outlets is fully open.

Although the downstream end 141b of the communication passage 141 pressurized by the pressurizing device 90 through the reserve tank 41B is connected to the circulating circuit 20 between the rotary valve 50 and the water pump 60 according to the fourth and fifth embodiments, the present disclosure is not limited to the example.

Figure 14:
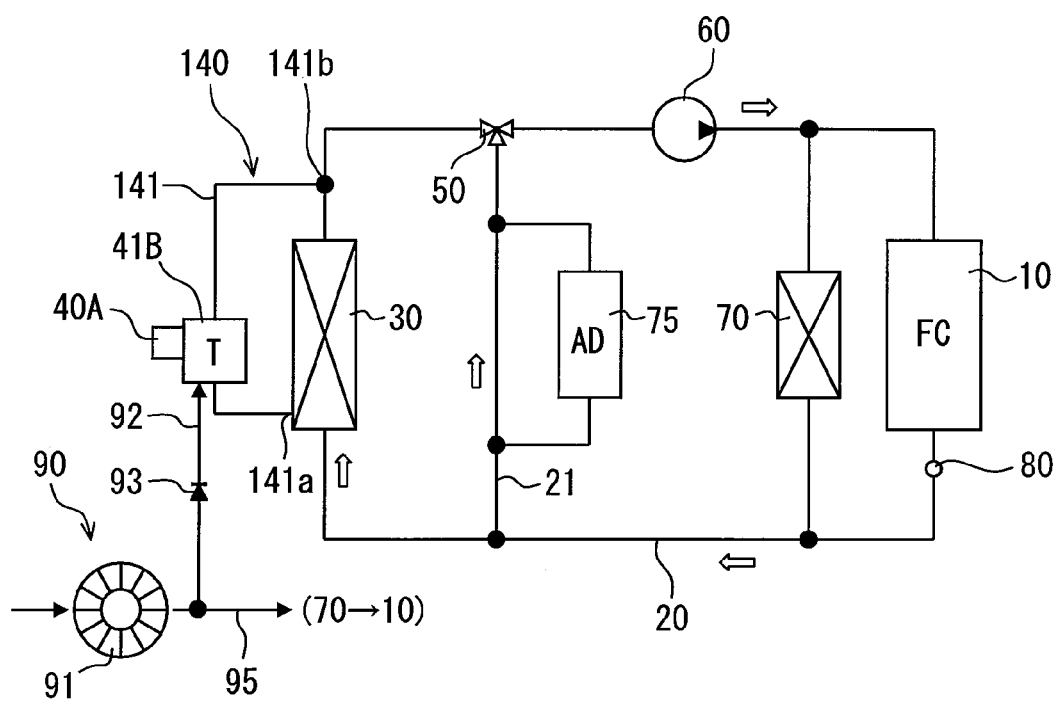
FIG. 14 is a diagram showing a fuel cell system according to a modification example.

For example, the downstream end 141b may be connected to a part in the circulating circuit 20 that is upstream of the rotary valve 50, as shown in FIG. 14. That is, there is no limitation as long as the pressurizing device 90 pressurizes inside of the communication passage 141. Thus, the pressure inside of the communication passage 141 can be relatively high within the predetermined pressure range that is regulated by the cap 40A to be higher than or equal to the atmospheric pressure. Accordingly, at the connecting point where the downstream end 141b of the communication passage 141 is connected to the circulating circuit 20, the pressure inside of the circulating circuit 20 can be relatively high within the predetermined pressure range that is higher than or equal to the atmospheric pressure. Therefore, even if the rotary valve 50 is located between inside of the water pump 60 and the connecting point where the downstream end 141b is connected to the circulating circuit 20, an internal pressure between them is increased overall, and the local low-pressure area where the cavitation occurs is hardly provided. Thus, the cavitation can be certainly restricted from occurring.

What is claimed is:

1. A fuel cell system, comprising:
a fuel cell unit having a fuel cell;
a circulating circuit in which coolant circulates to cool the fuel cell;
a radiator that is disposed in the circulating circuit and radiates heat of the coolant to outside;
a bypass passage that (i) is branched from the circulating circuit at a separating point that is located upstream of the radiator in a flow direction of coolant, (ii) is connected to the circulating circuit at a meeting point that is located downstream of the radiator in the flow direction of coolant, and (iii) makes the coolant bypass the radiator;
a three-way valve device that is disposed in the circulating circuit and adjusts a flow ratio of a coolant flowing through the radiator to a coolant flowing through the bypass passage;
a pump unit that is positioned downstream of the meeting point in the circulating circuit and makes the coolant circulate in the circulating circuit; and
a pressure regulator that is connected to the circulating circuit at a connecting point located upstream of the pump unit in a flow direction of coolant and that regulates a pressure in the circulating circuit to be within a predetermined pressure range that is higher than or equal to an atmospheric pressure at the connecting point, wherein
the three-way valve device is disposed upstream of the connecting point in the flow direction of coolant,
the three-way valve device has a single valve body that changes an opening degree of a first opening connecting to the radiator and an opening degree of a second opening connecting to the bypass passage, and
a total opening area of an opening area of the first opening and an opening area of the second opening in a case where the valve body is positioned at an intermediate opening position to open both the first opening and the second opening is larger than an opening area of one of the first opening and the second opening in a case where the valve body fully opens the one of the first opening and the second opening.

2. The fuel cell system according to claim 1, wherein
the pressure regulator is disposed at a location in the circulating circuit or in the radiator and is connected to the circulating circuit at the location.

3. The fuel cell system according to claim 1, wherein
the pressure regulator has: a communication passage that is disposed in parallel with the circulating circuit such that an upstream end and a downstream end are communicated with the circulating circuit; and a pressure regulating valve disposed in the communication passage, and
the connecting point is a downstream-side communicating point where the downstream end is communicated with the circulating circuit.

4. The fuel cell system according to claim 3, further comprising
a pressurizing device pressurizing an inside of the communicating passage.

5. The fuel cell system according to claim 4, wherein
the pressure regulator has a reserve tank that is disposed in the communicating passage and stores an excess of the coolant, and
the pressurizing device has a compressor compressing air and an introducing pipe introducing a compressed air compressed in the compressor into the reserve tank.

6. The fuel cell system according to claim 5, further comprising
a supply pipe supplying the compressed air that is compressed in the compressor to the fuel cell.

7. The fuel cell system according to claim 1, wherein
the pressure regulator is directly attached to the radiator.

8. A fuel cell system, comprising:
a fuel cell unit having a fuel cell;
a circulating circuit in which coolant circulates to cool the fuel cell;
a radiator that is disposed in the circulating circuit and radiates heat of the coolant to outside;
a bypass passage that (i) is branched from the circulating circuit at a separating point that is located upstream of the radiator in a flow direction of coolant, (ii) is connected to the circulating circuit at a meeting point that is located downstream of the radiator in the flow direction of coolant, and (iii) makes the coolant bypass the radiator;
a three-way valve device that is disposed in the circulating circuit and adjusts a flow ratio of a coolant flowing through the radiator to a coolant flowing through the bypass passage;
a pump unit that is positioned downstream of the meeting point in the circulating circuit and makes the coolant circulate in the circulating circuit; and
a pressure regulator that is connected to the circulating circuit at a connecting point located upstream of the pump unit in a flow direction of coolant and that regulates a pressure in the circulating circuit to be within a predetermined pressure range that is higher than or equal to an atmospheric pressure at the connecting point, wherein
the three-way valve device is disposed upstream of the connecting point in the flow direction of coolant,
the three-way valve device has a single valve body that changes an opening degree of a first opening connecting to the radiator and an opening degree of a second opening connecting to the bypass passage, and
a total opening area of an opening area of the first opening and an opening area of the second opening in a case where the valve body is positioned at an intermediate opening position to open both the first opening and the second opening is smaller than or equal to an opening area of one of the first opening and the second opening in a case where the valve body fully opens the one of the first opening and the second opening.

9. The fuel cell system according to claim 8, wherein
the pressure regulator is disposed at a location in the circulating circuit or in the radiator and is connected to the circulating circuit at the location.

10. The fuel cell system according to claim 8, wherein
the pressure regulator has: a communication passage that is disposed in parallel with the circulating circuit such that an upstream end and a downstream end are communicated with the circulating circuit; and a pressure regulating valve disposed in the communication passage, and
the connecting point is a downstream-side communicating point where the downstream end is communicated with the circulating circuit.

11. The fuel cell system according to claim 10, further comprising
a pressurizing device pressurizing an inside of the communicating passage.

12. The fuel cell system according to claim 11, wherein
the pressure regulator has a reserve tank that is disposed in the communicating passage and stores an excess of the coolant, and
the pressurizing device has a compressor compressing air and an introducing pipe introducing a compressed air compressed in the compressor into the reserve tank.

13. The fuel cell system according to claim 12, further comprising
a supply pipe supplying the compressed air that is compressed in the compressor to the fuel cell.

14. The fuel cell system according to claim 8, wherein
the pressure regulator is directly attached to the radiator.

* * * * *